US012695945B2

(12) United States Patent
Dunn

(10) Patent No.: US 12,695,945 B2
(45) **Date of Patent: \*Jul. 28, 2026**

(54) PROOF OF PLAY FOR IMAGES DISPLAYED AT ELECTRONIC DISPLAYS

(71) Applicant: Manufacturing Resources International, Inc., Alpharetta, GA (US)

(72) Inventor: William Dunn, Alpharetta, GA (US)

(73) Assignee: Manufacturing Resources International, Inc., Alpharetta, GA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 19/237,281

(22) Filed: Jun. 13, 2025

(65) Prior Publication Data

US 2025/0310600 A1      Oct. 2, 2025

Related U.S. Application Data

(63) Continuation of application No. 18/394,492, filed on Dec. 22, 2023, now Pat. No. 12,363,379, which is a continuation of application No. 17/567,442, filed on Jan. 3, 2022, now Pat. No. 11,895,362.

(60) Provisional application No. 63/282,737, filed on Nov. 24, 2021, provisional application No. 63/273,616, filed on Oct. 29, 2021.

(51) Int. Cl.
*H04N 21/442* (2011.01)
*H04N 21/81* (2011.01)

(52) U.S. Cl.
CPC ..... *H04N 21/44204* (2013.01); *H04N 21/812* (2013.01)

(58) Field of Classification Search
CPC ..................... H04N 21/2407; H04N 21/44204
See application file for complete search history.

(56) References Cited

U.S. PATENT DOCUMENTS

| | | | |
|---|---|---|---|
| 9,147,194 B1 * | 9/2015 | Le ..................... G06Q 30/0203 |
| 11,088,772 B1 | 8/2021 | Wright et al. |
| 11,711,555 B1 | 7/2023 | Sendurpandian et al. |
| 2006/0184961 A1 * | 8/2006 | Lee .................. H04N 21/23418 |
| | | | 725/32 |
| 2007/0028111 A1 | 2/2007 | Covely |

(Continued)

*Primary Examiner* — John W Miller
*Assistant Examiner* — Akshay Doshi
(74) *Attorney, Agent, or Firm* — Standley Law Group LLP; Jeffrey S. Standley; Adam J. Smith

(57) ABSTRACT

A display assembly providing proof of play information is disclosed. Content items, including static content files, each of which comprises a single image for display in each play instance for a period of consecutive seconds, are displayed at electronic display, at least in part by way of a media player. A unit controller causes a cumulative play count for each of the content items to be stored and maintained over time, redundancy check codes to be generated for the content items such that a respective code is consistently generated for each of the content items, and is consistently and consecutively generated for each of the static content items in each of the play instances, and where a consistent redundancy check code is consecutively generated for a respective one of the content items in a respective one of the play instances, cause the play count associated therewith to be incremented.

20 Claims, 12 Drawing Sheets

(56)    References Cited

U.S. PATENT DOCUMENTS

| | | | |
|---|---|---|---|
| 2010/0011392 A1 | 1/2010 | Bronstein et al. | |
| 2013/0088661 A1* | 4/2013 | Shin | G02F 1/133308 |
| | | | 349/62 |
| 2013/0155090 A1* | 6/2013 | Pourbigharaz | G06F 1/3265 |
| | | | 345/589 |
| 2014/0253813 A1 | 9/2014 | Bakar | |
| 2016/0371269 A1* | 12/2016 | Pereira | G06F 16/2379 |
| 2018/0189276 A1 | 7/2018 | Fonseca, Jr. et al. | |
| 2019/0033583 A1 | 1/2019 | Chauveau | |
| 2019/0042647 A1 | 2/2019 | Oh | |
| 2019/0089811 A1 | 3/2019 | White et al. | |
| 2019/0245636 A1* | 8/2019 | De Laet | H04N 21/2407 |
| 2020/0145721 A1* | 5/2020 | Tapse | H04N 21/23418 |
| 2020/0244951 A1 | 7/2020 | Holloway et al. | |
| 2020/0286120 A1 | 9/2020 | Sun et al. | |
| 2020/0327578 A1 | 10/2020 | Moubayed et al. | |
| 2020/0404007 A1* | 12/2020 | Singh | G06F 16/24537 |
| 2021/0012382 A1* | 1/2021 | Bird | G06Q 30/0266 |
| 2021/0120307 A1 | 4/2021 | Bastable et al. | |
| 2021/0174715 A1* | 6/2021 | Holloway | G06Q 30/0277 |
| 2022/0303642 A1 | 9/2022 | Briercliffe | |
| 2024/0048394 A1 | 2/2024 | Völcker et al. | |

* cited by examiner

Figure 3:
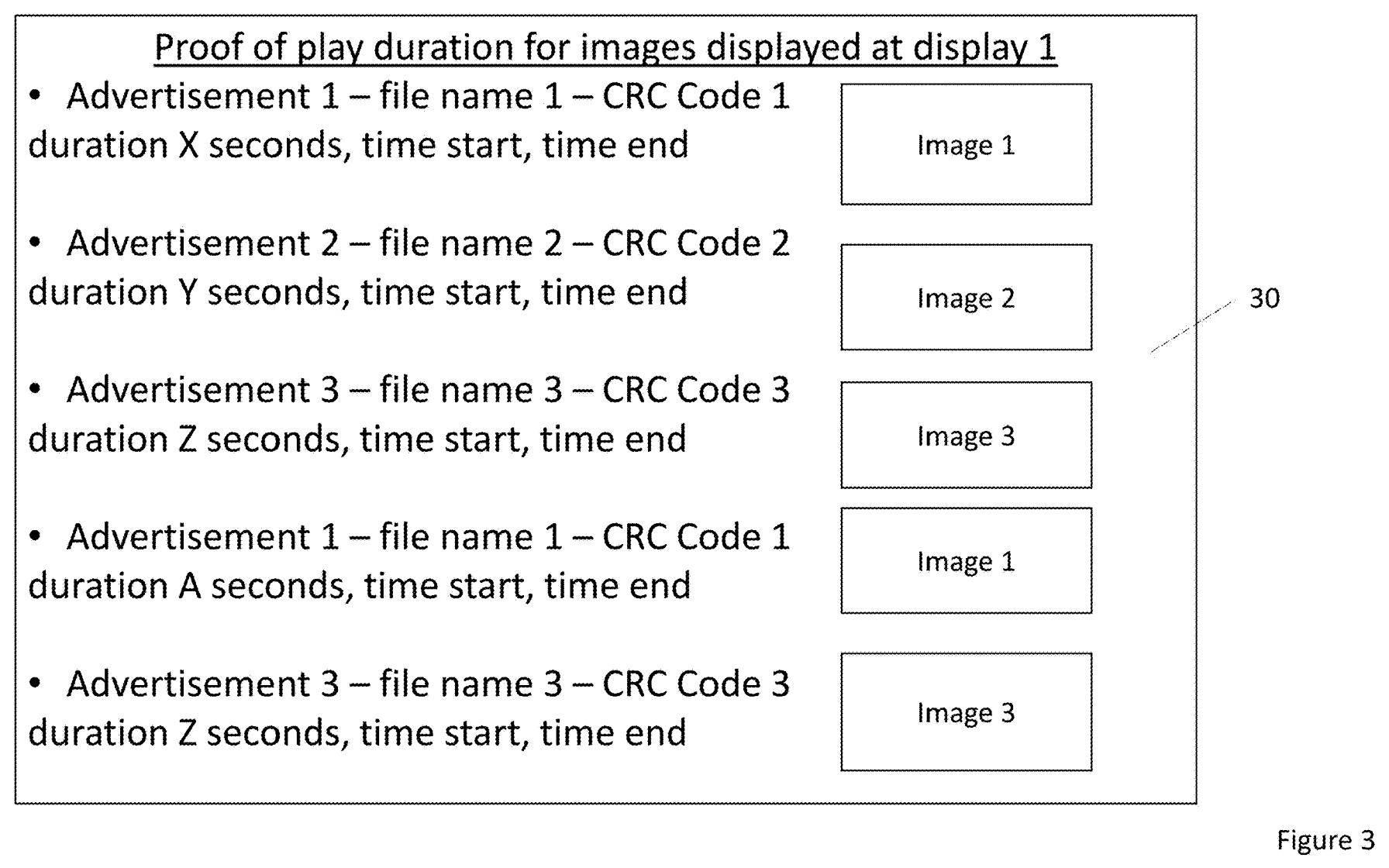

Proof of play duration for images displayed at display 1

- Advertisement 1 – file name 1 – CRC Code 1 duration X seconds, time start, time end Image 1

- Advertisement 2 – file name 2 – CRC Code 2 duration Y seconds, time start, time end Image 2

- Advertisement 3 – file name 3 – CRC Code 3 duration Z seconds, time start, time end Image 3

- Advertisement 1 – file name 1 – CRC Code 1 duration A seconds, time start, time end Image 1

- Advertisement 3 – file name 3 – CRC Code 3 duration Z seconds, time start, time end Image 3

Identify content item for proof of play

Generate CRC code for content item

Query proof of play database to retrieve proof of play information associated with CRC code Generate proof of play report Receive request for proof of play from customer Retrieve all CRC codes associated with customer or generate CRC code for all images associated with customer Query database for proof of play information associated with all CRC codes Generate proof of play report

Figure 7A:
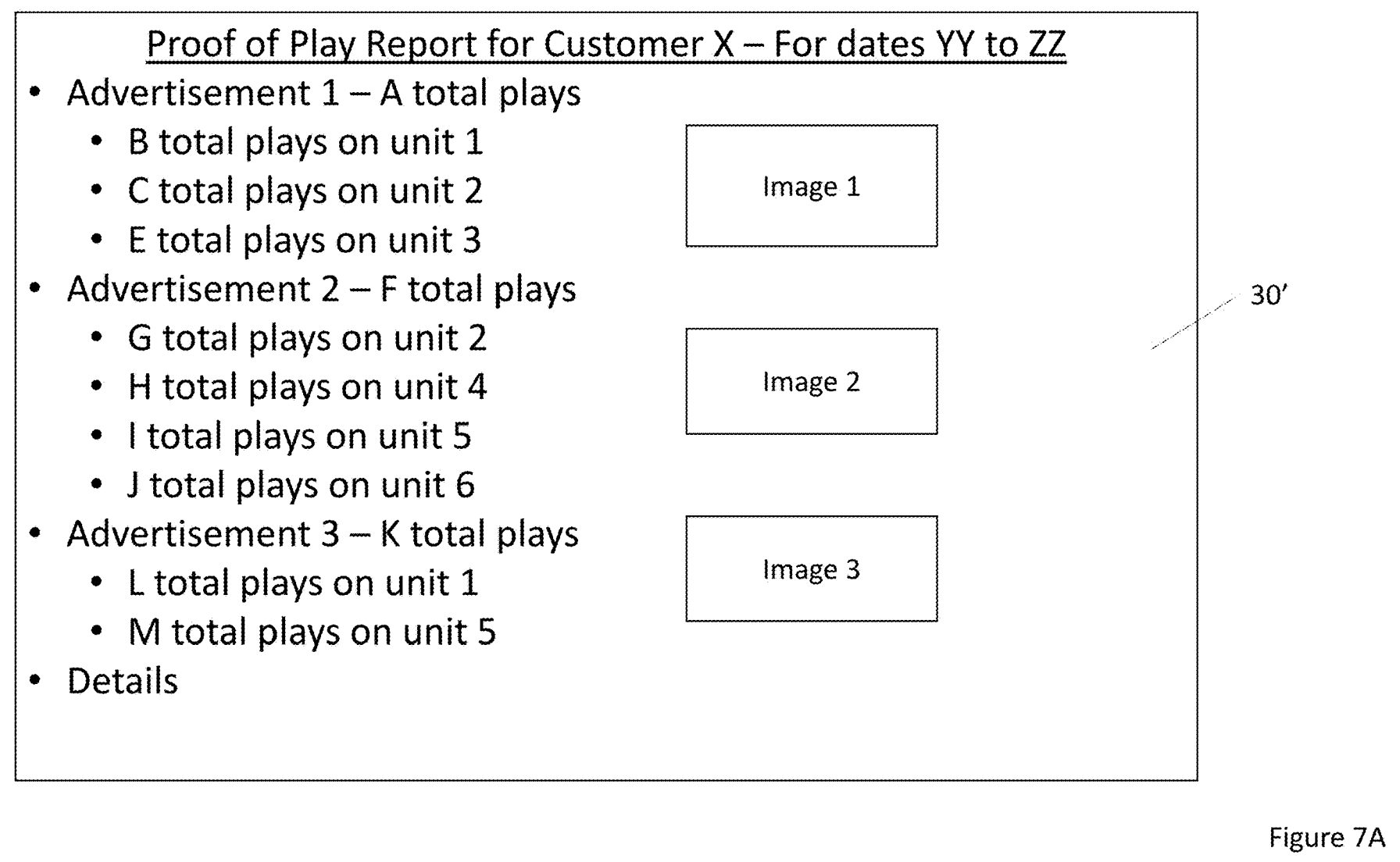

Proof of Play Report for Customer X – For dates YY to ZZ

- Advertisement 1 – A total plays
  - B total plays on unit 1
  - C total plays on unit 2
  - E total plays on unit 3
- Advertisement 2 – F total plays
  - G total plays on unit 2
  - H total plays on unit 4
  - I total plays on unit 5
  - J total plays on unit 6
- Advertisement 3 – K total plays
  - L total plays on unit 1
  - M total plays on unit 5
- Details Image 1

Image 2

Image 3

30″

Proof of Play Report for Image 1 – For dates YY to ZZ

Image 1

- Unit 1 – A total plays
- Unit 2 – B total plays
- Unit 3 – C total plays
- Details

PROOF OF PLAY FOR IMAGES DISPLAYED AT ELECTRONIC DISPLAYS

CROSS-REFERENCE TO RELATED APPLICATIONS

This application is a continuation of U.S. patent application Ser. No. 18/394,492 filed Dec. 22, 2023, which is a continuation of U.S. patent application Ser. No. 17/567,442 filed Jan. 3, 2022, now U.S. Pat. No. 11,895,362 issued Feb. 6, 2024, which claims the benefit of U.S. Provisional Patent Application Ser. No. 63/273,616 filed Oct. 29, 2021 and U.S. Provisional Patent Application Ser. No. 63/282,737 filed Nov. 24, 2021, the disclosures of each of which are hereby incorporated by reference as if fully restated herein.

TECHNICAL FIELD

Exemplary embodiments relate generally to systems and methods for providing proof of play for images displayed at electronic displays.

BACKGROUND AND SUMMARY OF THE INVENTION

The digital out of home ("DOOH") advertising market has grown in recent years to better reach an increasingly mobile population. Such DOOH advertising is often provided by way of ruggedized electronic display assemblies installed at various, relatively high traffic locations, such as city sidewalks, shopping malls, and transit stations to name a few examples. Static or dynamic content items, such as but not limited to advertisements, announcements, or other messages provided in one or more electronic images, may be displayed at these electronic display assemblies. Proof of play is often desired for such images. For example, electronic display assembly owners or operators want to know that their units are functional. As another example, customers paying for advertising opportunities want verification that their advertising dollars are being spent as agreed. Sometimes, proof of play is accomplished by provision of documents representing the playlist electronically provided to the media players of the electronic display assemblies. Essentially, these files represent input provided to the media players (i.e., play media file 1, then media file 2, then media file 3, etc.). However, for a number of reasons, images represented in these playlists may not actually be displayed at the electronic displays of the electronic display assemblies. For example, a named media file may be missing, corrupted, mislabeled, or otherwise unable to be called up by the media player. As another example, certain hardware of the assembly may be undergoing a software update and may override the display with a specified image for a period of time. As yet another example, the media player may be malfunctioning or inoperative. There are a number of other reasons why the images provided in the playlists may not actually be displayed. Furthermore, once an error occurs, the electronic displays may sometimes be frozen or otherwise unable to function properly for an extended period of time. Regardless, the playlists provided as input to the media players may not accurately represent the content items actually displayed. Therefore, what is needed are systems and methods which provide more accurate proof of play for electronic display assemblies.

Systems and methods which provide more accurate proof of play for electronic display assemblies are provided. The disclosed systems and methods may include the ability to provide duration of play information and/or play count information for content items displayed at electronic displays, such as but not limited to, dynamic content and static content items.

Unit controllers may be electronically interposed between media players and electronic displays. In exemplary embodiments, the unit controllers may be electronically interposed between the media players and field programmable gate arrays (FPGAs) for electronic display assemblies. In this way, data leaving the media players may be monitored for proof of play, rather than just playlists being fed to the media players. This may provide for more accurate proof of play reporting.

The unit controllers may comprise proof of play modules, though such proof of play modules may, alternatively or additionally, be provided elsewhere. The proof of play modules may be configured to generate cyclic redundancy check ("CRC") codes for some or all images leaving the media player. The generated CRC codes may be stored at a database in association with proof of play information, which may include start time of play, end time of play, duration of play, display unit information, number of plays, combinations thereof, or the like.

A CRC code may be generated for each image frame leaving the media player and stored at the database, in exemplary embodiments. However, in other exemplary embodiments, a CRC code may be generated for every $N^{th}$ number image frame, where "N" is any number (i.e., 1, 2, 3, etc.). Where static content items are displayed, the generated CRC code may be the same, or substantially the same, so long as the same image continues playing. In this manner, start times, end times, duration of play information, and/or a play count may be determined for each static content item displayed by monitoring the CRC codes for changes. For example, without limitation, where the CRC code changes, the proof of play module may determine that a new static content item is being started and record a start time accordingly. When the CRC code changes again, the proof of play module may determine that another new static content item has started and an end time may be recorded. From the start and end times, a duration of play may be determined.

Furthermore, the same CRC code may be generated where the same content item is displayed in different instances. For example, without limitation, even when the same image is played at several different times during the same or different days (whether as part of static content or dynamic content), the CRC code may remain the same, or substantially the same. Each time the CRC code is generated for a given instance, a play counter may be incremented accordingly. The proof of play modules may be configured to count each time a given CRC code is generated in an uninterrupted instance, such as where a static content item comprising a single image is displayed for a period of time, to be a single instance of play and increment the play counter accordingly (e.g., by one). In this manner, various proof of play information, including but not limited to, number and/or durations of play may be tracked across one or multiple displays for various time periods.

Where dynamic content is used, such as short movie clips, a CRC code may be generated for a first image, last image, $N^{th}$ image, combinations thereof, or the like. The CRC code may, alternatively or additionally, be generated as a numerical amalgamation of CRC codes for some or all images in a dynamic content item, such as but not limited to, by addition, subtraction, multiplication, division, averaging, combinations thereof, or the like. In this manner, a CRC code may be developed for dynamic content, such as on a consistent, repeatable basis.

If one of the CRC codes generated is not already stored at the database, electronic image data associated with such CRC code(s) may be stored with the proof of play information, such as a thumbnail version of the content item. If the CRC codes generated are already stored, the electronic image data may not be uploaded for storage. In this manner, use of network and/or electronic storage resources may be minimized.

Content items for which a proof of play report is desired may be uploaded, such as to one of the proof of play modules, the database, or the like. A CRC code may be generated for each uploaded content item by the same or different techniques as used to generate CRC codes for content items displayed at the electronic display assemblies. The database may be queried for proof of play information associated with each such CRC code to generate a proof of play report for each of the content items. Alternatively, or additionally, CRC code information, customer information, combinations thereof, or the like may be provided to generate the proof of play report, which may be image, customer, time range, and/or unit specific by way of non-limiting example. By storing CRC code information, such as rather than screen captures of every image displayed, electronic storage and/or network usage may be streamlined. The proof of play information may be stored in association with the CRC code information, customer information, combinations thereof, or the like to facilitate generation of such reports.

The proof of play reports may include duration of play information for some or all of the content items. This may be particularly important for static content items where customers often pay for a specified duration of play (e.g., 5 seconds). Duration of play information may also be important for dynamic content to demonstrate play of the entire clip, or of the clip multiple times, for example. Where dynamic content is utilized, the CRC code may be generated for a particular frame of a video, such as, but not limited to, the first frame, last frame, X number frame, combinations thereof, or the like. Multiple such CRC codes may, alternatively or additionally, by utilized and stored separately or numerically amalgamated into a single code. In this way, play count and other proof of play information may be stored for such dynamic content items. The proof of play report may optionally include a full size or thumbnail version of the image displayed. The proof of play report may, alternatively or additionally, indicate a number of times one of more content images has been played.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 3 is an exemplary proof of play report produced by the systems of FIGS. 2A-2B;

FIG. 7A is an exemplary customer specific proof of play summary report produced by the systems of FIGS. 2A-2B and/or the logic of FIG. 6A.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
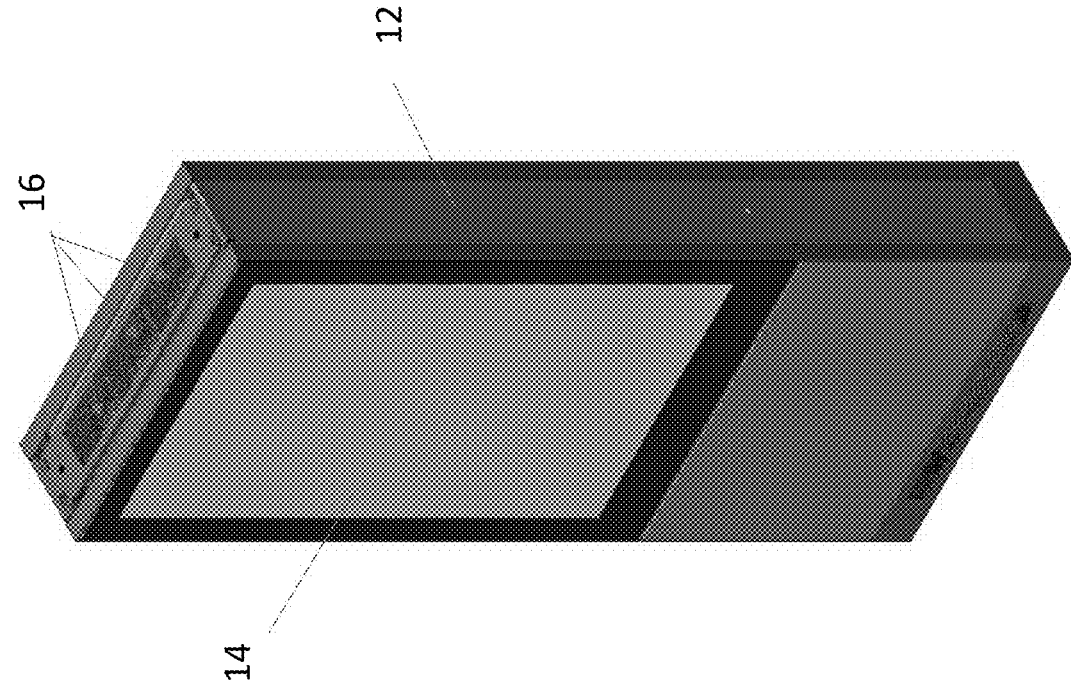
FIG. 1 is a perspective view of an exemplary electronic display assembly.

FIG. 1 is a perspective view of an exemplary electronic display assembly (hereinafter also a "unit") 10. The unit 10 may include a structural framework 12. The structural framework 12 may be configured for mounting to a ground surface, such as a sidewalk or street, mounting to a wall or other surface, incorporation into street furniture (e.g., phone booths, bus shelters, benches, railings, combinations thereof, or the like), combinations thereof, or the like. The structural framework 12 may comprise one or more members, panels, cladding, combinations thereof, or the like. The structural framework 12 may serve as a stable base for attachment of other components. Alternatively, or additionally, the structural framework 12 may be configured to form a complete or partial housing for such other components.

The units 10 may comprise one or more electronic display subassemblies 14. Each of the electronic display subassemblies 14 may be connected, directly or indirectly, to the structural framework 12. For example, without limitation, a single electronic display subassembly 14 may be attached to the structural framework 12 to provide a single-sided unit 10. As another example, without limitation, two electronic display subassemblies 14 may be attached to the structural framework 12, such as in a back-to-back arrangement, to provide a double-sided unit 10.

Each of the electronic display subassemblies 14 may comprise some or all of the following, one or more of each of which of the same or different type may be provided: a cover comprising one or more layers and/or optical enhancement films (e.g., antireflective film, polarizers, combinations thereof, or the like), an electronic display 15 (e.g., LCD, LED, plasma, or the like), a backlight (e.g., direct, edge lit), electronic equipment (e.g., media players 25, controllers 18, network connectivity devices 24, FPGAs 26, proof of play modules 28, electronic storage devices, processors, power supplies, sensors (e.g., temperature, air pressure, air samplers, humidity, air speed, voltage, amperage, combinations thereof, or the like), edge computers, combinations thereof, or the like), fans, heat sinks, heat dissipation devices, thermal transfer devices, housings, mounting equipment, peripherals (e.g., telecommunications equipment, cameras, auxiliary touch screens, microphones, emergency beacons, lights, electronic charging adapters, combinations thereof, or the like), combinations thereof, or the like. Alternatively, or additionally, some or all such equipment may be connected, directly or indirectly, to the structural framework at locations between, above, and/or below the electronic display subassemblies 14. Alternatively, or additionally, the layers and/or optical enhancement films may be provided at other items, such as on front surfaces of the electronic display 15.

Some or all of the electronic display subassemblies 14 may be moveably attached to the structural framework 12, though such is not required. For example, the electronic display subassemblies 14 may be attached to the structural framework 12 in a hinged manner, such as about a primarily vertical extending axis or a primarily horizontal extending axis, to permit selective movement between a closed position whereby certain parts of the units 10 are fully or partially sealed, and an open position whereby certain parts of the interior of the unit 10 are exposed for access. Two electronic display subassemblies 14 may be mounted to the structural framework 12 to face in substantially opposing directions, for example without limitation.

One or more intakes and exhausts 16 may be provided at the units 10 for ingesting and exhausting ambient air. The units 10 may comprise one or more open loop airflow pathways for ambient air to travel through some or all of the units 10 to provide thermal management. Alternatively, or additionally, the units 10 may comprise one or more closed loop airflow pathways for circulating gas to travel through some or all of the units 10 to provide thermal management. In exemplary embodiments, the open loops and closed loops are configured to provide thermal interaction between the ambient air and circulating gas, such as but not limited to, with limited to no mixing (e.g., at a heat exchanger), for removing heat generated by the units 10. Such open and/or closed loop airflow pathways may be as shown and/or described in one or more of U.S. Pat. No. 8,854,595 issued Oct. 7, 2014, U.S. Pat. No. 8,767,165 issued Jul. 1, 2014, U.S. Pat. No. 8,654,302 issued Feb. 18, 2014, U.S. Pat. No. 8,351,014 issued Jan. 8, 2013, U.S. Pat. No. 10,660,245 issued May 19, 2020, U.S. Pat. No. 10,194,564 issued Jan.

29, 2019, and/or U.S. Pat. No. 10,398,066 issued Aug. 27, 2019, by way of non-limiting example, the disclosures of each of which are hereby incorporated by reference as if fully restated herein. The structure and/or mechanical operation of the units 10, and the various components thereof, and/or airflow configurations may include those shown and/or described in U.S. Pat. No. 10,485,113 issued Nov. 19, 2019 (the "'133 Patent"), by way of non-limiting example, the disclosures of which are hereby incorporated by reference in their entirety. Movements and/or structures for facilitating movement of the electronic display subassemblies 14 may be as shown and/or described in at least the '133 Patent, by way of non-limiting example.

Figure 2A:
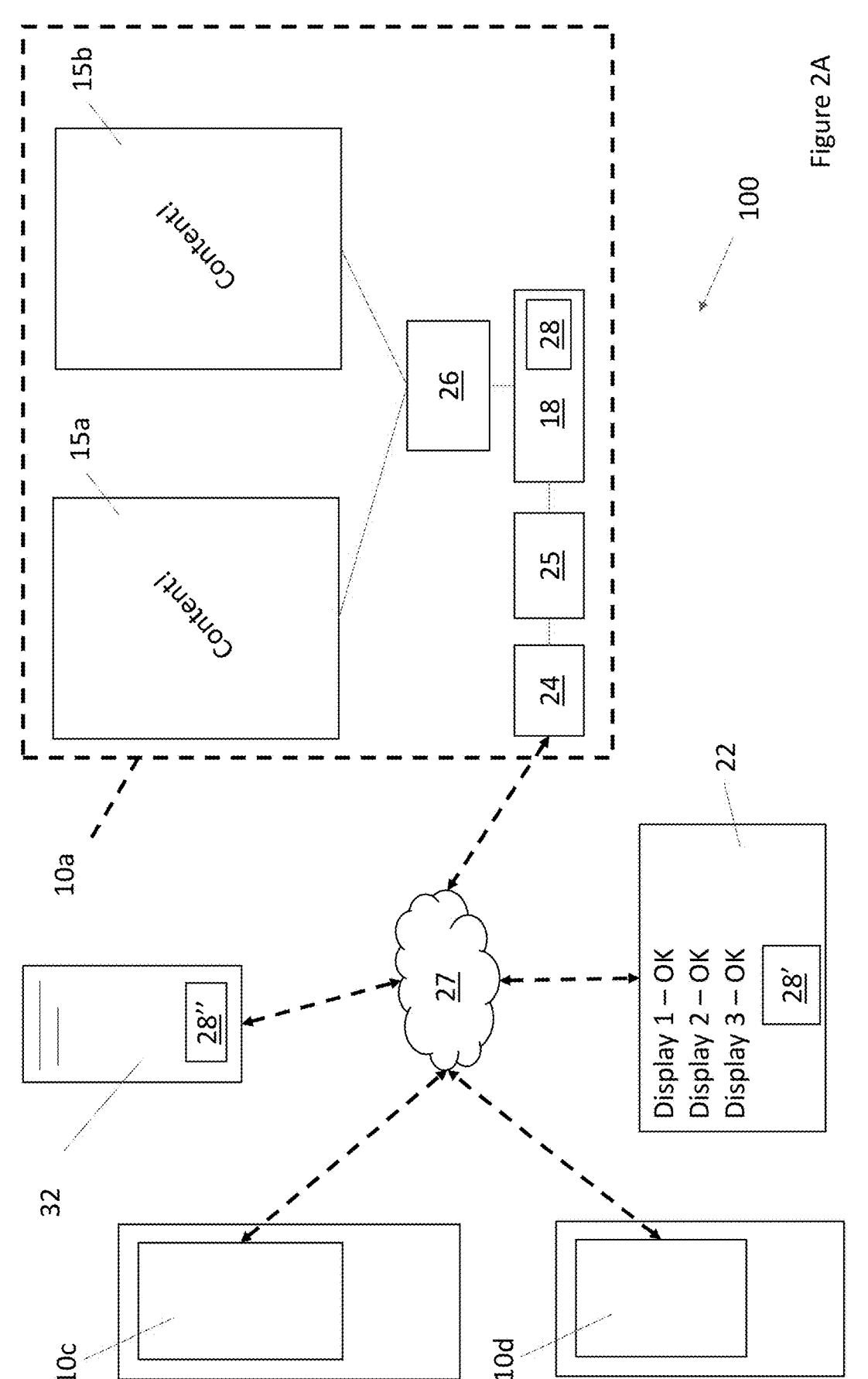
FIG. 2A is a simplified system diagram for providing proof of play for multiple ones of the electronic display assembly of FIG. 1.
Figure 2B:
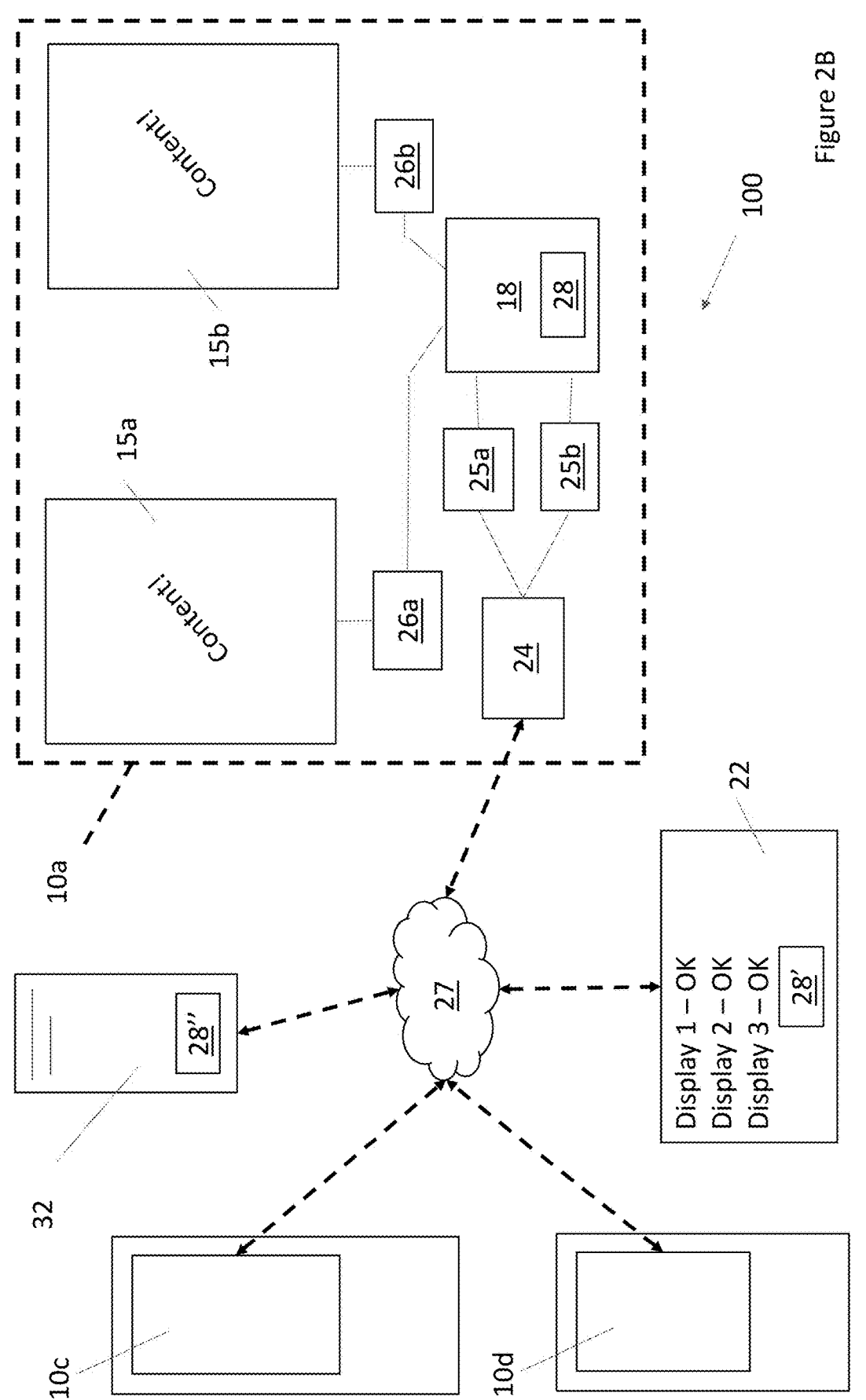
FIG. 2B is another simplified system diagram for providing proof of play for multiple ones of the electronic display assembly of FIG. 1.

FIG. 2A and FIG. 2B illustrate exemplary embodiments of systems 100 for providing proof of play for content items displayed at the electronic displays 15 of the electronic display subassemblies 14 of one or more of the units 10. The content items may include static content (e.g., single electronic images), dynamic content (e.g., video clips), combinations thereof, or the like. In exemplary embodiments, the static content may include a single image displayed for a period of time (e.g., 5 seconds) and the dynamic content may include a series of images, such as a short video clip. The content may comprise advertisements, announcements, or other messages.

Each of the electronic displays 15 of a given unit 10 may be in electronic communication with a unit controller 18. The unit controller 18 may comprise, or be in electronic communication with, a proof of play module 28. Each proof of play module 28 may comprise, or be in electronic communication with, one of more software routines, electronic storage devices, processors, time keeping devices, combinations thereof, or the like. The software routines and other electronically stored items may be stored locally at the proof of play modules 28 or accessed remotely, such as at one or more cloud-based servers. The proof of play modules 28 may be part of the unit controllers 18 or separate therefrom (e.g., cloud-based).

The unit controller 18 may be in electronic communication with, or comprise, one or more media players 25. A separate media player 25 may be provided for some or all of the electronic displays 15 of a unit 10. Alternatively, a media player 25 may be common to multiple ones, or all, of the electronic displays 15 of a unit 10.

Each of the video players 25 may comprise, or be in electronic communication with, a separate FPGA 26. Alternatively, a FPGA 26 may be common to multiple ones of the video players 25 and/or electronic displays 15.

Each of the unit controllers 18 may be in electronic communication with the operations controller(s) 22, such as by way of network communication devices 24 and/or networks 27. The networks 27 may comprise cellular networks, wireless networks, wired networks, combinations thereof, or the like. The operations controller(s) 22 may comprise personal computers, smartphones, tablets, network operation centers, combinations thereof, or the like.

Each of the unit controllers 18 may be in electronic communication with one or more databases 32. The database(s) 32 may comprise one or more image and/or video files, proof of play information, CRC codes, information about the units 10, customer information, combinations thereof, or the like. The database(s) 32 may be separate from, or part of, the units 10. The operations controller(s) 22 may be in electronic communication with the database(s) 32. Alternatively, or additionally, the database(s) 32 may be part of the operations controller(s) 22.

The operations controller 22 may be in electronic communication with one or more customer devices, such as but not limited to, personal computers, smartphones, tablets, combinations thereof, or the like. Alternatively, or additionally, the customer devices may be in electronic communication with some or all of the unit controller 18 and/or databases 32.

The unit controller 18 may be in electronic communication with various components of the units 10 such as, but not limited, to fans, sensors, electronic storage devices, processors, computers, cameras, peripheral devices, combinations thereof, or the like. The same or different proof of play module 28' may alternatively, or additionally, be provided at, or be in electronic communication with, the operations controller(s) 22. The same or different proof of play module 28" may alternatively, or additionally, be provided at, or be in electronic communication with, the proof of play database(s) 32.

Any number of units 10 of the same or different type may be connected to the operations controller 22. Particularly, but not limited to, where just a single unit 10 is utilized, the unit controller 18 may act as the operations controller 22. Multiple operations controller 22 may be utilized, such as for various subgroups of units 10 (e.g., a Midwest operations controller 22, a northeast operations controller 22, etc.).

FIG. 3 illustrates an exemplary proof of play report 30. The reports 30 may include duration of play information for images played at one or more of the units 10 and/or electronic displays 15. The report 30, in exemplary embodiments, may comprise, for example, without limitation, order of play information, file name information, CRC code information, duration of play information, time start information, time end information, unit 10 information, display 15 information, media player 25 information, content item data (e.g., electronic image data, thumbnail images, full size images, or the like), play count information for content items (e.g., content item specific, customer specific, across all units 10 and/or displays 15, unit 10 specific, display specific 15, time period specific, combinations thereof, or the like), combinations thereof, or the like. The duration of play may be calculated by the unit controller 18, operations controller 22, proof of play modules 28, combinations thereof, or the like, such as from the start and end of play times. The duration of play information may only be available for static content, and/or may be available for dynamic content.

The database(s) 32 may comprise data sufficient to generate the reports 30. The report 30 may comprise any type or kind of information provided in any format or organized in any fashion. The report 30 may be filterable, sortable, combinations thereof, or the like. The reports 30 may be specific to particular images, electronic displays 15, units 10, customers, owners, operators, users, combinations thereof, or the like. The reports 30 may be provided in electronic or physical form.

Figure 4A:
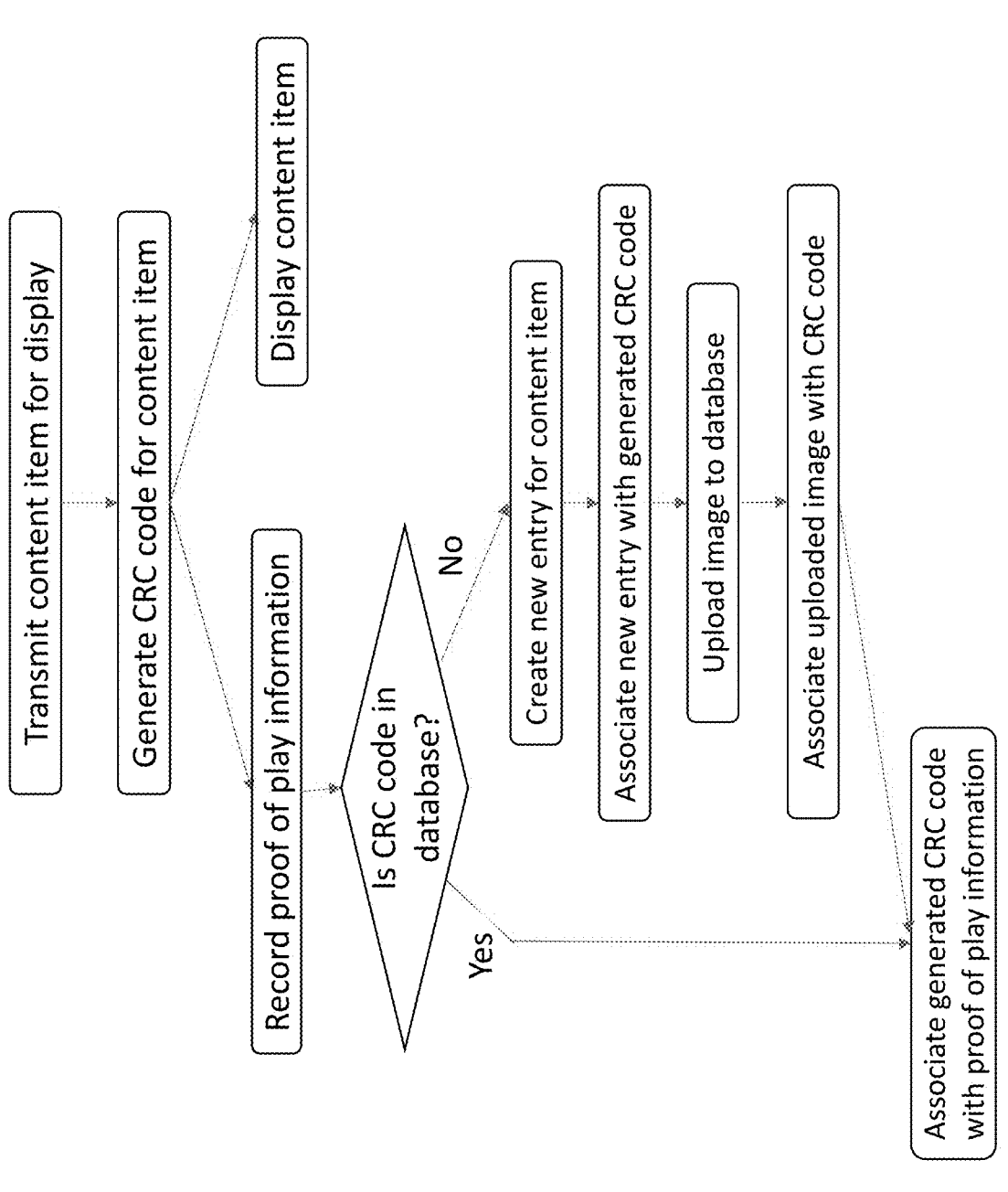
FIG. 4A is a flow chart with exemplary logic for operating the systems of FIGS. 2A-2B.
Figure 4B:
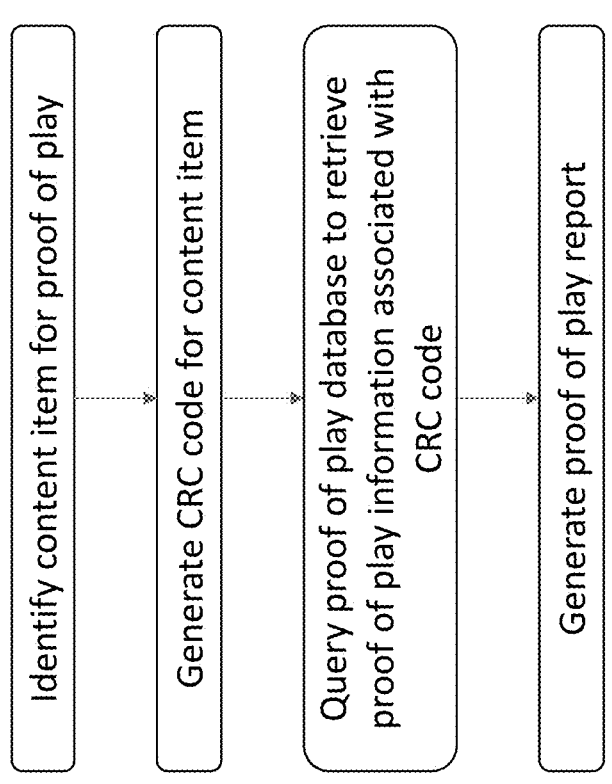
FIG. 4B is a flow chart with other exemplary logic for operating the systems of FIGS. 2A-2B.

FIG. 4A is a flow chart with exemplary logic for generating proof of play information for content items comprising electronic images displayed at the electronic display assembly 10, and FIG. 4B is a flow chart with exemplary logic for generating proof of play reports based on the proof of play information. Playlists may be electronically provided to the media players 25. In exemplary embodiments, such playlists may be provided from the operations controller(s) 22, though they may be loaded locally, provided from customer devices, or by other ways. The media players 25 may be configured to execute the provided playlists. These playlists may be electronically recorded by the proof of play modules 28 or otherwise.

Data leaving the media players 25 may pass through the unit controller 18, which may comprise, or be in electronic communication with, the proof of play module 28, on way to the FPGAs 26 and/or the electronic displays 15. In this manner, the proof of play module 28 may be configured to receive data regarding image data actually transmitted for play by the media player(s) 25. As such, the data leaving the media player 25 may be analyzed for proof of play rather than, or in addition to, playlists provided to the media player 25. This may provide more accurate proof of play and may reduce or eliminate discrepancies between the provided playlists and the actually displayed images.

CRC codes may be generated for each and every content item and/or image transmitted for display by the media players 25 to the electronic displays 15. The CRC codes may be generated based on an analysis of the entire image or portions thereof, such as but not limited to various, specific subpixels. Alternatively, or additionally, the CRC codes may be generated for each new image, periodically, randomly, combinations thereof, or the like. The CRC codes may be generated by the proof of play modules 28, though such is not required. Alternatively, or additionally, the proof of play modules 28 may be configured to receive CRC codes for all images displayed by the media player(s) 25 as generated by another component or subsystem. The CRC codes may comprise checksums. Any type or kind of code may be generated based on any type or kind of CRC technique, or combinations of techniques. The CRC codes may serve as a content item identifier in exemplary embodiments. The CRC codes may serve as a customer identifier in exemplary embodiments.

Where static content items are transmitted by the media player 25 for display, the CRC code generated may remain the same, or substantially the same, while the static content item continues to be transmitted by the media player 25 for display. For example, without limitation, where a static content item is transmitted for display, the CRC code generated may be the same each time the particular static content item (e.g., electronic image data) is transmitted by the media player 25 for display. This may permit counting the number of times a particular static content item is displayed based on the number of discrete, non-continuous instances in which the CRC code is generated. In exemplary embodiments, the proof of play modules 28 may be configured to count instances where the same CRC code is continuously generated without interruption over a period of immediately consecutive instances to be a single play (e.g., the same image being played for 10 seconds). This may also permit tracking play count across multiple units 10.

This may also permit determination of a duration of play for static content items. For example, without limitation, each time the generated CRC code changes (see also e.g., FIG. 5B), a determination may be made, such as but not limited to at the proof of play module 28, that a new image and/or content item is starting or has started and records a start time accordingly. When the CRC code changes again, the proof of play module may determine that another new image and/or content item is starting or has started and an end time may be recorded. From the start and end times, a duration of play may be derived.

Where dynamic content is utilized (e.g., multiple sequential images, video clips, GIFS, combinations thereof, or the like), a single CRC code, or multiple CRC codes, may be generated and/or utilized for each of the dynamic content items. For example, without limitation, a CRC code may be generated for a particular frame of a video, such as, but not limited to, the first frame, last frame, X number frame, combinations thereof, or the like. Multiple such CRC codes may, alternatively or additionally, be generated and/or utilized. For example, without limitation, a composite CRC code may be generated by combining CRC codes for each image in the dynamic content (e.g., addition, subtraction, averaging, numerical amalgamation, combinations thereof, or the like). As another example, multiple CRC codes may be stored for such dynamic content, such as for some or all images in such content. In this manner, the same CRC codes may be repeatedly generated for the same dynamic content item. In this manner, a play count for dynamic content items may be determined.

Where CRC codes for first and last images of a dynamic content item are known, duration of play may be provided. For example, without limitation, a start time may be recorded each time the CRC code for the first image of the dynamic content item is generated and an end time may be recoded each time the CRC code for the last image of the dynamic content item is generated, thereby permitting derivation of duration of play information.

In exemplary embodiments, without limitation, the proof of play module 28 may be configured to compensate for minor variations in CRC codes and/or images, such as, but not limited to, due to display 15 settings and/or type, media player 25 settings and/or type, combinations thereof, or the like.

The unit controllers 18 and/or FPGAs 26 may be configured to cause the images commanded to be displayed by the media player(s) 25 to be displayed at the respective one or ones of the electronic display(s) 15.

The CRC codes for displayed images may be reported to the database(s) 32 for proof of play purposes. Initially, a check may be performed to see if the CRC code of an image is already stored at the database(s) 32. If not, the image data may be uploaded to the database(s) 32 for storage in association with the CRC code, customer information, proof of play information, combinations thereof, or the like. The image data may comprise raw image data, compressed image data, thumbnail image data, or the like. Alternatively, or additionally, the image data may be compressed or reformatted for storage, though such is not required. In this manner, a representation of the content item display may be reproduced, such as in the report 30.

The proof of play data may be stored at the database(s) 32 in association with the CRC codes, customer information, image data for the played images, combinations thereof, or the like. The proof of play data may include order of play information, file name information, CRC code information, duration of play information, time start information, time end information, unit 10 information, display 15 information, media player 25 information, play count information, time and date information, combinations thereof, or the like.

The customer information may include a customer name, unique customer identifier, combinations thereof, or the like.

In exemplary embodiments, each image played and/or analyzed for proof of play may be time stamped or otherwise associated with a time of play to derive time information (e.g., start time, end time, duration of play). For example, without limitation, each CRC code generated for each image may be time stamped. Where static content is played, the start and end times of play may be determined where the CRC codes generated changes from a first code to a second code. For example, each time a newly generated CRC code is different from a prior generated CRC code, a new start time may be recorded. So long as the static content continues playing, the CRC code generated may remain the same, such as the second code. So, when the CRC code changes again, such as to a third code, the end time may be recorded as the final instance the prior CRC code (e.g., the second code) was generated, and a new start time for the new content item may be recorded (e.g., for the third code). Only the start and end times may be recorded. Alternatively, or additionally, each image generated may be time stamped and the start and end times may be subsequently identified to derive duration of play information. Alternatively, or additionally, a timer may be started and ended upon changing of the CRC codes to determine duration of play.

For dynamic content, the start and end times may be determined based on commands provided to, or data leaving, the media player 25 indicating continued play of the dynamic content. Alternatively, or additionally, duration of play information in such instances may be preprogrammed. Alternatively, or additionally, duration of play information may be determined from known CRC codes for a first image in a given dynamic content item and a last image in a given dynamic content item.

One or more images and/or content items may be uploaded for proof of play. For example, without limitation, a customer may submit a number of images and/or content items it wishes to obtain proof of play reports 30 for. CRC codes for each of the provided images and/or content items may be generated. The CRC codes may be generated by the proof of play modules 28, though such is not required.

The database(s) 32 may be queried for all proof of play information associated with the queried CRC code(s) to generate the proof of play report(s) 30. The proof of play report(s) 30 may be generated by the proof of play modules 28, the database(s) 32, unit controller 18, and/or operations controllers 22. The proof of play reports 30 may comprise the images representing content items, though such is not required.

By using the CRC codes, such as instead of actual screen captures, the amount of data that is stored at the database(s) 32 may be drastically reduced.

Figure 5A:
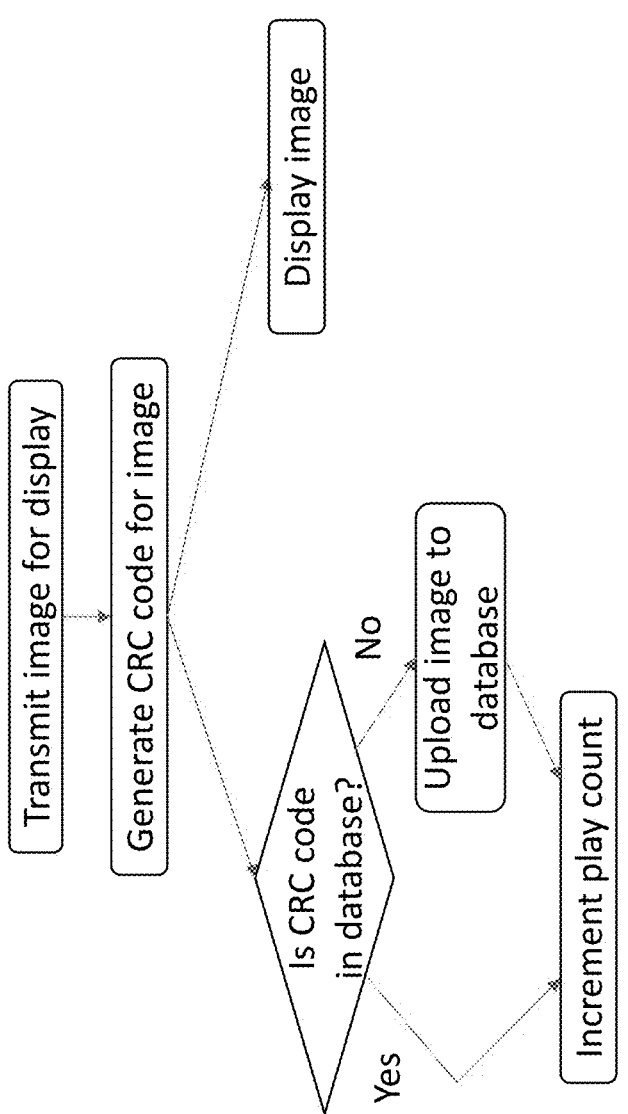
FIG. 5A is a flow chart with other exemplary logic for operating the systems of FIGS. 2A-2B.
Figure 5B:
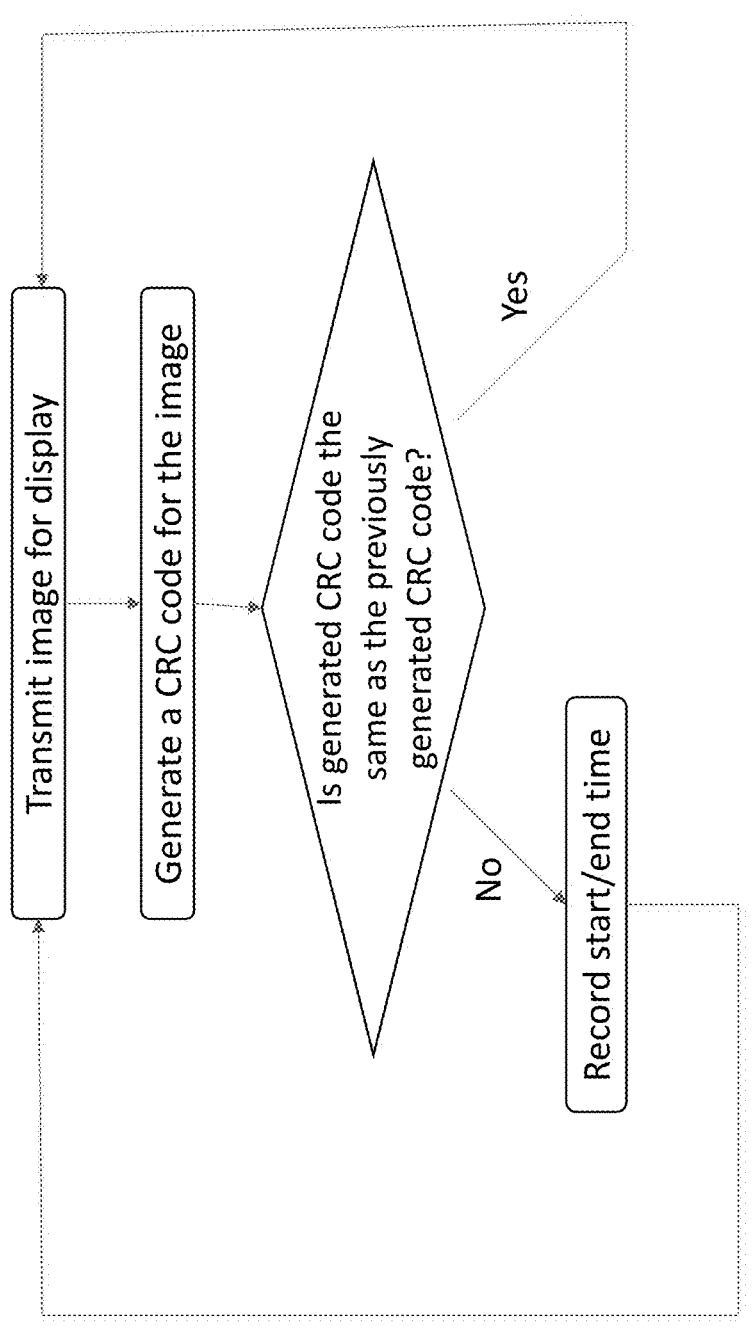
FIG. 5B is a flow chart with other exemplary logic for operating the systems of FIGS. 2A-2B.

FIG. 5A and FIG. 5B provide other exemplary logic for providing proof of play information for images displayed at the electronic display assembly 10. Such logic may be employed, together or separately, in addition to, or alternatively to, other logic shown and/or described herein. The proof of play module 28 may be configured to generate a CRC code for each image the media player 25 transmits to the display(s) 15. In exemplary embodiments, the CRC code is generated for each transmitted image, however, in other exemplary embodiments, a CRC code may be generated for each new image, each new content item (such as but not limited to a determined by the electronic playlist or otherwise), periodically, randomly, combinations thereof, or the like. If the database(s) 32 already comprises the CRC code, the play count associated with the CRC code, stored image, or other proof of play or image information may be incremented, such as by 1, to reflect the play of the content item. If the database(s) 32 does not already comprise the CRC code (and therefore a copy of the image is presumably not stored), electronic image data for the content item may be uploaded (such as, but not limited, to in compressed form), such as before the play count is incremented. Alternatively, or additionally, a new entry into the database(s) 32 to track proof of play for the new content item may be generated. The new entry may initially set the play count to 1 in exemplary embodiments. In this way, a play count may be generated, such as for use in the proof of play report 30 and/or to generate a customer specific proof of play summary report 30' and/or content item specific proof of play summary report 30" as further detailed herein.

Figure 6A:
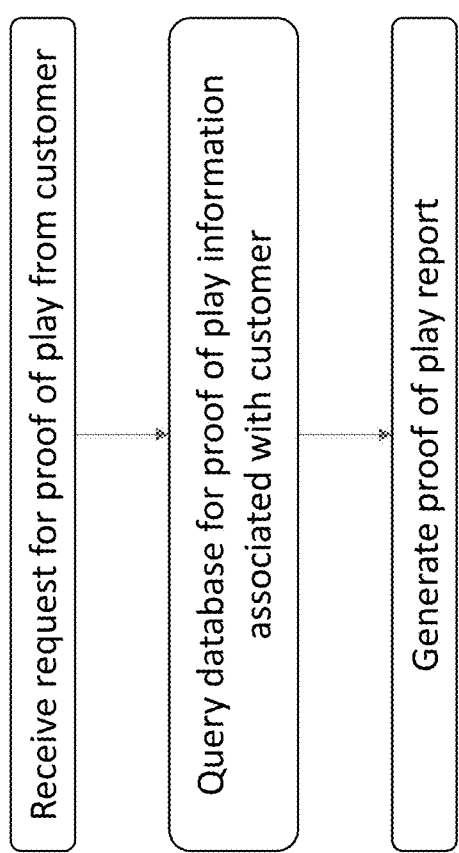
FIG. 6A is a flow chart with exemplary logic for creating a customer specific summary report with the systems of FIGS. 2A-2B.
Figure 6B:
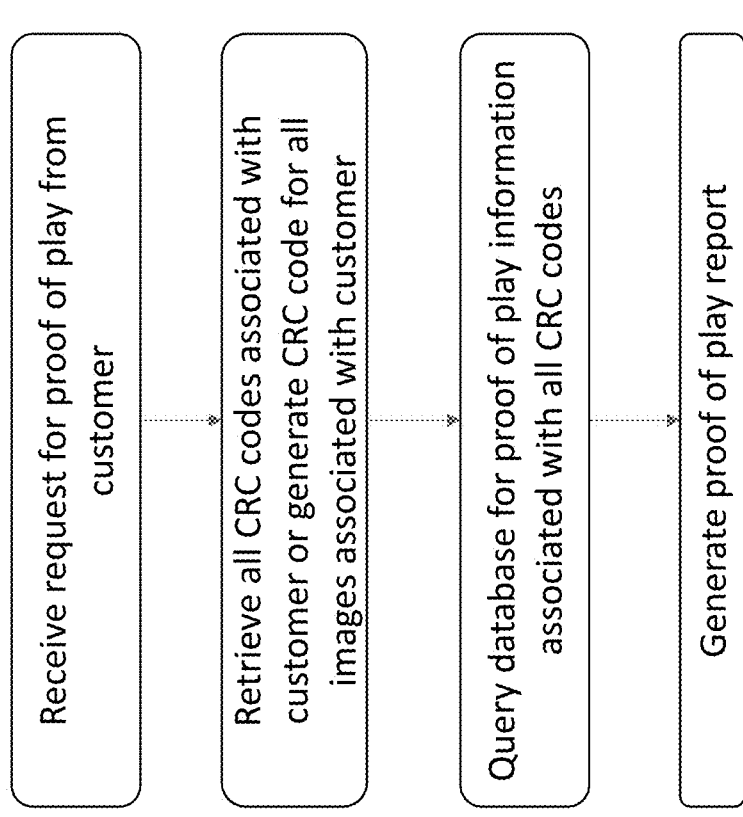
FIG. 6B is a flow chart with exemplary logic for creating a content item specific summary report with the systems of FIGS. 2A-2B.

FIG. 6A and FIG. 6B illustrate exemplary logic for generating the reports 30, 30', and/or 30". Such logic may be employed, together or separately, in addition to, or alternatively to, other logic shown and/or described herein. An image and/or content item for proof of play may be uploaded and a CRC code may be generated and used to retrieve associated proof of play information from the database(s) 32, such as, but not limited to, the total number of times the image and/or content item has been played and/or at what displays 15 and/or units 10. Alternatively, or additionally, the CRC code itself may be entered, or customer information provided for query to generate the reports 30, 30', and/or 30". The reports 30, 30', and/or 30" may be specific to a time frame.

Figure 7B:
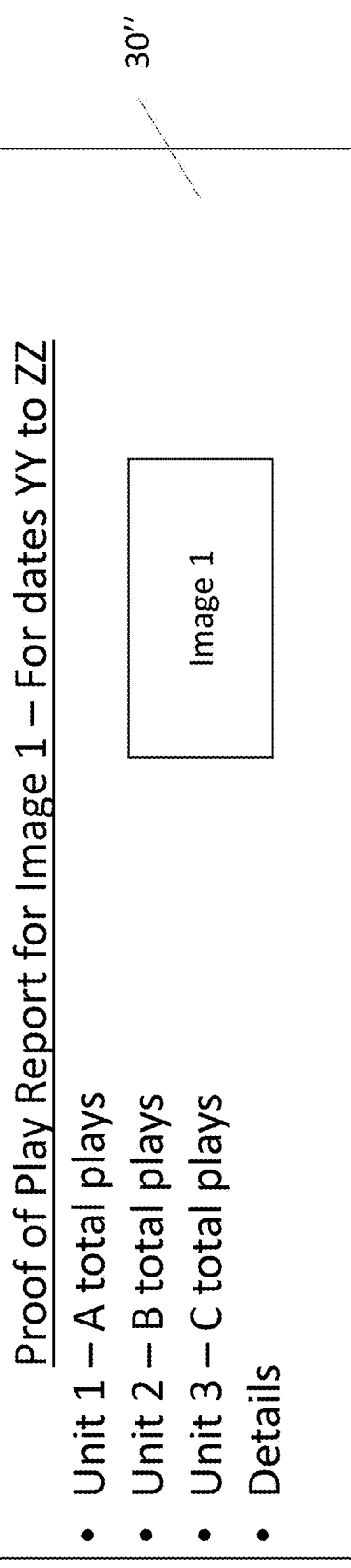
FIG. 7B is an exemplary content item specific proof of play summary report produced by the systems of FIGS. 2A-2B and/or the logic of FIG. 6B.

As shown with regard to FIG. 7A and FIG. 7B, the summary reports may comprise, for example without limitation, a total play count for each image and/or content item for which proof of play is requested and/or each image and/or content item associated with a given customer. The summary reports 30' and/or 30" may provide total play count information specific to various units 10 or displays 15, by way of non-limiting example. Alternatively, or additionally, the summary reports 30' and/or 30" may provide a compressed or thumbnail version of the image and/or content item in question, by way of non-limiting example. The summary reports 30' and/or 30" may comprise other proof of play information, such as, but not limited to, the information shown and/or described in the reports 30, and/or may provide an option to provide and/or view such further information.

The reports 30, 30', 30" may be customer specific, image specific, content item specific, unit 10 specific, display specific 15, date specific, date range specific, time specific, time range specific, geographically specific (as to the location of the units 10), time of day specific (each evening, each morning, etc.), season specific, combinations thereof, or the like. Alternatively, or additionally, the reports 30, 30', 30" may be filterable by such criteria or the like. The reports 30, 30', 30" may include proof of play information for a given image and/or content item across multiple units 10 or a single unit 10.

The proof of play information may be stored in association with the CRC code information, customer information, combinations thereof, or the like to facilitate generation of the reports 30, 30', 30".

The type and/or arrangement of information as shown in the reports 30, 30', 30" is merely exemplary and not intended to be limiting. Any type of information may be provided in any arrangement.

Electronic communications described herein may be one-way or two-way. Connections described herein may be direct or indirect.

Any of the steps shown and/or described herein may be omitted, repeated, performed out of order, combinations thereof, or the like.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, combinations thereof, and the like configured to perform the operations described herein. The electronic devices may be general purpose computers or specialized computing devices. The electronic devices may comprise personal computers, smartphone, tablets, databases, servers, or the like. The electronic connections and transmissions described herein may be accomplished by wired or wireless means. The computerized hardware, software, components, systems, steps, methods, and/or processes described herein may serve to improve the speed of the computerized hardware, software, systems, steps, methods, and/or processes described herein.

What is claimed is:

1. A display assembly providing proof of play information, said display assembly comprising:
    an electronic display for displaying content;
    a media player for providing content items to the electronic display for display, said content including static content files, each of which comprises a single image for display at the electronic display in a given play instance for a period of consecutive seconds; and
    a unit controller comprising one or more non-transitory electronic storage devices comprising software instructions, which when executed, configure one or more processors to:
        store and maintain cumulative play counts for the content items over time on a content item specific basis;
        generate redundancy check codes for the content items provided by the media player to the electronic display for display such that the redundancy check codes are consistently generated for the content items on the content item specific basis, including by consistently and consecutively generating the redundancy check codes for the static content items in the play instances on a static content item and play instance specific basis; and
        determine if a consistent redundancy check code is consecutively generated on the play instance specific basis, and if so, cause a play count of the cumulative play counts associated with an associated one of the content items to be incremented.

2. The display assembly of claim 1 wherein:
    the unit controller is electronically interposed between the media player and the electronic display.

3. The display assembly of claim 2 further comprising:
    a field programmable gate array electronically interposed between the unit controller and the electronic display.

4. The display assembly of claim 1 wherein:
    the one or more non-transitory electronic storage devices of the unit controller comprise additional software instructions, which when executed, configure the one or more processors of the unit controller to:
        following and in response to generating the redundancy check codes and on the play instance specific basis, determine if the generated redundancy check code exists in memory, and:
            if so, cause the play count associated with the generated redundancy check code to be incremented; and if not, cause a new entry to be generated in the memory for the generated redundancy check code comprising a new play count forming part of the cumulative play counts, and cause the new play count to be set to an initial value.

5. The display assembly of claim 4 wherein:

the initial value is one; and the one or more non-transitory electronic storage devices of the unit controller comprise additional software instructions, which when executed, configure the one or more processors of the unit controller to:

increment the cumulative play counts by increments of one.

6. The display assembly of claim 4 wherein:

the one or more non-transitory electronic storage devices of the unit controller comprise additional software instructions, which when executed, configure the one or more processors of the unit controller to:

where the determination is made that the generated redundancy check code does not exist in memory, generate a copy of the associated content item and store the copy of the associated content item in the memory in association with the new entry.

7. The display assembly of claim 6 wherein:

the copy of the associated content item comprises a compressed version of the content item.

8. The display assembly of claim 6 wherein:

the memory comprises one or more non-transitory electronic storage devices remote from the display assembly; and the display assembly comprises one or more network communication devices for communication with the one or more non-transitory electronic storage devices remote from the display assembly.

9. The display assembly of claim 8 wherein:

the one or more non-transitory electronic storage devices remote from the display assembly comprise redundancy check codes and associated play counts for other display assemblies.

10. The display assembly of claim 6 wherein:

the one or more non-transitory electronic storage devices comprise the memory.

11. The display assembly of claim 1 wherein:

at least some of the one or more processors are part of the unit controller.

12. The display assembly of claim 1 wherein:

at least some of the one or more processors are remote from the display assembly.

13. The display assembly of claim 1 further comprising:

a structural framework supporting the electronic display, the media player, and the unit controller, wherein the electronic display comprises a liquid crystal layer, a cover layer, and a backlight for the liquid crystal layer.

14. The display assembly of claim 1 wherein:

the one or more non-transitory electronic storage devices of the unit controller comprise additional software instructions, which when executed, configure the one or more processors of the unit controller to:

where the redundancy check codes are consistently and consecutively generated, on the play instance specific basis, identify a first time and a last time a respective one of the redundancy check codes is consistently and consecutively generated for a respective one of the play instances and store a duration between the first time and the last time as a duration of play for respective one of the content items for the respective one of the play instances.

15. The display assembly of claim 1 wherein:

at least some of the content items comprise dynamic content items; and the one or more non-transitory electronic storage devices of the unit controller comprise additional software instructions, which when executed, configure the one or more processors of the unit controller to:

for the dynamic content items, generate the redundancy check codes for a predetermined one of the images of the dynamic content items.

16. The display assembly of claim 1 wherein:

the redundancy check codes comprise cyclic redundancy check codes.

17. The display assembly of claim 16 wherein:

the redundancy check codes comprise checksums.

18. The display assembly of claim 1 wherein:

the one or more non-transitory electronic storage devices of the unit controller comprise additional software instructions, which when executed, configure the one or more processors of the unit controller to:

associate the cumulative play counts with customer identifiers.

19. A display assembly providing proof of play information, said display assembly comprising:

an electronic display for displaying content comprising a cover layer, a liquid crystal layer, and a backlight for the liquid crystal layer;

a media player for providing content items for display at the electronic display, said content including static content files, each of which comprises a single image for display at the electronic display in each play instance for a period of consecutive seconds ("static content items");

a unit controller electronically interposed between the media player and the electronic display and comprising one or more non-transitory electronic storage devices comprising software instructions, which when executed, configure one or more processors to:

store and maintain, at a memory, cumulative play counts for the content items over time, wherein each of the play counts is associated with a respective redundancy check code and a customer identifier;

generate the redundancy check codes for the content items transmitted from the media player to the electronic display such that a respective one of the redundancy check codes is consistently generated for a respective one of the content items, and the respective one of the redundancy check codes is consistently and consecutively generated for a respective one of the static content items in each of the play instances, and for each of the redundancy check codes generated, determine if the generated redundancy check code exists at the memory, and:

if so, cause the play count associated with the generated redundancy check code to be incremented; and if not, cause a new entry to be generated in the memory for the generated redundancy check code, cause the play count for the new entry to be set to a predetermined initial value, generate a compressed version of the content item associated with the new entry ("associated content item"), and store the copy of the compressed version of the associated content item in the memory in association with the new entry; and determine if a consistent redundancy check code is consecutively generated for a respective one of the content items in a respective one of the play instances, and if so, cause the play count associated with the respective one of the content items to be incremented.

20. A display assembly providing proof of play information, said display assembly comprising:

an electronic display;

a media player for providing content items for display at the electronic display, said content including static content files, each of which comprises a single image for display at the electronic display in each play instance for a period of consecutive seconds ("static content items");

a unit controller electronically interposed between the media player and the electronic display and comprising one or more non-transitory electronic storage devices comprising software instructions, which when executed, configure one or more processors of the unit controller to:

store and maintain, at the one or more non-transitory electronic storage devices, a proof of play database comprising a cumulative play count for each of the content items over time, wherein each of the play counts is associated with a respective redundancy check code and a customer identifier;

generate the redundancy check codes for and based on the content items transmitted from the media player to the electronic display such that a respective one of the redundancy check codes is consistently generated for each of the content items, and the respective one of the redundancy check codes is consistently and consecutively generated for each of the static content items in each of the play instances, and for each of the redundancy check codes generated, determine if the generated redundancy check code exists at the one or more non-transitory electronic storage devices, and:

if so, increment the play count associated with the generated redundancy check code at the proof of play database; and if not, generate a new entry at the proof of play database for the generated redundancy check code, set the play count for the new entry to a predetermined initial value, and generate a compressed version of an associated one of the content items ("associated content item") and store the copy of the compressed version of the associated content item in the memory in association with the new entry;

determine if a consistent redundancy check code is consecutively generated for a respective one of the content items in a respective one of the play instances, and if so, increment the play count associated with the respective one of the content items at the proof of play database; and receive proof of play report requests from remote devices comprising one of the customer identifiers, and in response, generate a proof of play report comprising the compressed version of the content items and the play counts for each entry in the proof of play database.

* * * * *